Aug. 5, 1958 C. HEFFNER 2,846,091
INVALID HANDLING APPARATUS FOR VEHICLES
Filed Sept. 28, 1956 2 Sheets-Sheet 2

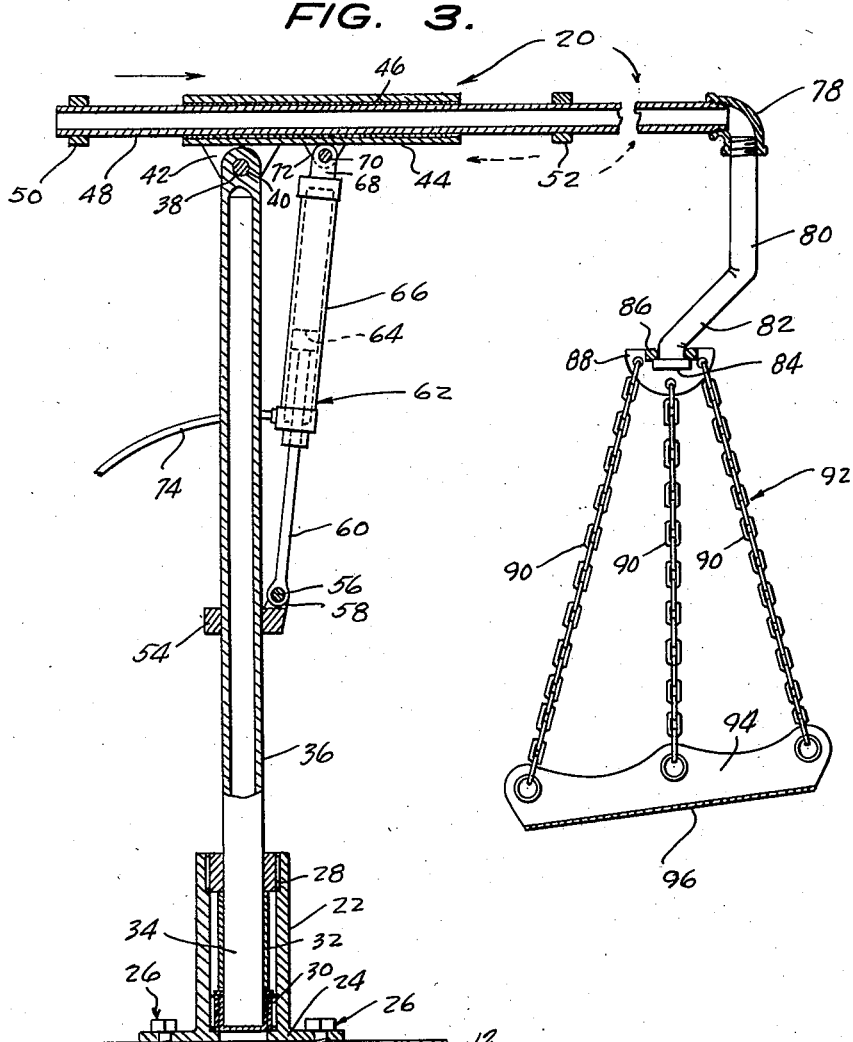
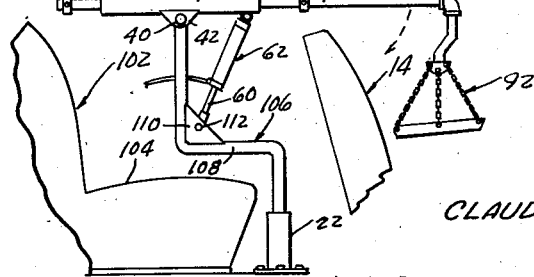

INVENTOR.
CLAUDE HEFFNER,
BY
McMorrow, Berman + Davidson
ATTORNEYS.

United States Patent Office 2,846,091
Patented Aug. 5, 1958

2,846,091

INVALID HANDLING APPARATUS FOR VEHICLES

Claude Heffner, Brockway, Pa.; Ruth R. Heffner, executrix of said Claude Heffner, deceased Application September 28, 1956, Serial No. 612,812

2 Claims. (Cl. 214—75)

This invention relates to improved invalid handling apparatus for installation in an automotive vehicle for lifting an invalid onto and from the front seat of the vehicle from outside of the vehicle.

The primary object of the invention is to provide more practical and efficient apparatus of this kind which is simple in construction, is composed of a small number of simple and easily assembled parts, and which has a pivoted horizontal boom which is operated by a hydraulic jack, powered by a hand pump or other source of fluid pressure.

Another object of the invention is to provide apparatus of the character indicated above which is mounted removably in a socket secured to the vehicle floor behind the front seat of the vehicle and can be swung out of the region of the front seat or removed and stored when not in use.

A further object of the invention is to provide invalid handling apparatus of the character indicated, which can be made in well-finished, rugged, and serviceable forms at relatively low cost, is easily installed and maintained, can be stored in the trunk of a vehicle, and is highly satisfactory and acceptable for the purpose intended.

These together with other objects and advantages which will become apparent reside in the details of construction and operation as more fully hereinafter described and claimed, reference being had to the accompanying drawings forming a part hereof, wherein like numerals refer to like parts throughout, and in which:

Figure 3 is an enlarged fragmentary vertical transverse sectional view taken substantially on line 3—3 of Figure 2, portions being broken away and in section; and Figure 4 is a fragmentary side elevational view, on a reduced scale, similar to Figure 1, showing a modified form of pedestal for the invalid handling apparatus.

Figure 1:
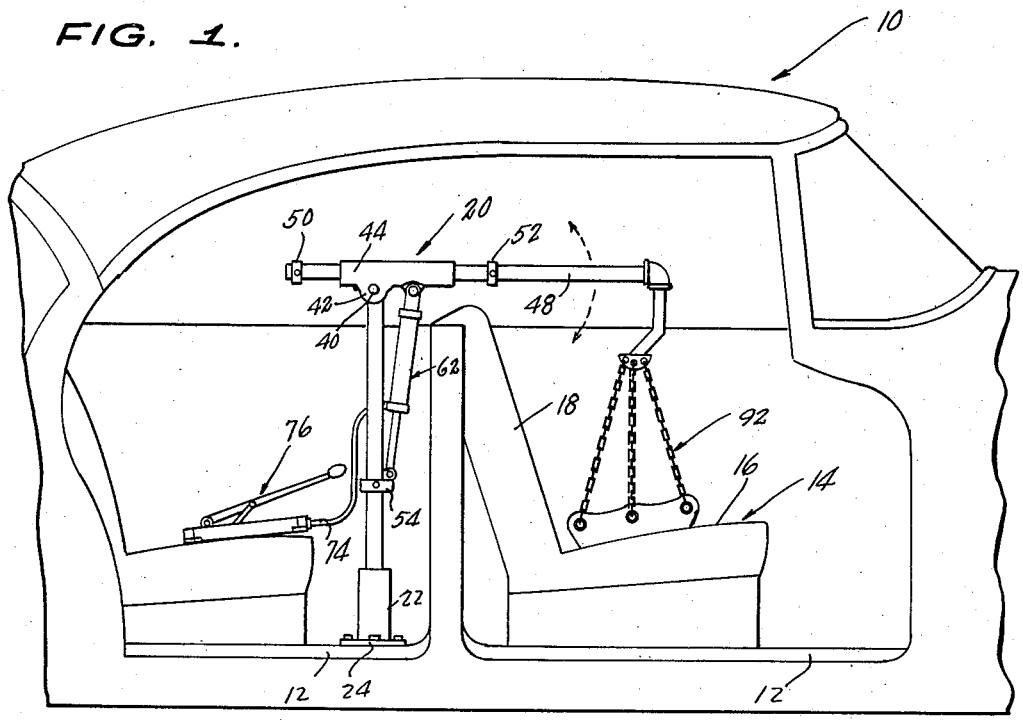
Figure 1 is a fragmentary side view of an automotive vehicle, the doors of the same being removed, showing installed therein an invalid handling apparatus of the invention.

Referring to the drawings in detail, a fragmentary portion of a "hardtop" type of vehicle, indicated generally at 10, is shown which is without a door post between the front and rear sets of the vehicle. The vehicle 10 includes a floor 12, a front seat assembly, indicated generally at 14, having a horizontal seat 16, and a vertical back rest 18.

The illustrated invalid handling apparatus, indicated generally at 20, comprises a vertical socket 22 having a lateral flange 24 on its lower end which is secured to the floor 12 behind the front seat assembly 14 by bolts 26.

The socket 22 has secured therein vertically spaced upper and lower bearings 28 and 30, see Figure 3, secured on the upper and lower ends of a cup 32, which telescopically and removably receives therein the lower end portion 34 of a vertical column or standard 36.

The standard 36 may be tubular, as seen in Figure 3, or solid if preferred, and is traversed at its upper end by an opening 38 receiving therethrough a pivot 40 extending through spaced ears 42 on opposite sides of the upper end of the standard 36, which are fixed to and depend from the inner end of a horizontal sleeve 44 which has a lining 46 of bearing material. Reciprocably received in the sleeve 44 is a boom 48. Stop collars 50 and 52 are adjustably secured on the boom 48 at opposite ends of the sleeve 44 for limiting the length of travel of the boom 48 relative to the sleeve 44.

A collar bracket 54 is circumposed about the standard or column 36 and is slidable therealong and has thereon a pivot 56 extending transversely through an ear 58 on the lower end of a piston rod 60 of a fluid jack 62. The piston rod 60 is integral with a piston 64 working in a cylinder 66 which has on its upper end an ear 68 connected by a pivot pin 70 to a depending ear 72 fixed to the midpoint of the sleeve 44. The cylinder 66 is connected by a pressure line 74 leading from a hand pump 76 of any suitable character, which is operable for extending the piston rod 60 from the cylinder 66 so as to adjust the angle of the boom 48 relative to the standard 36.

The boom 48 has suitably secured on its forward end, as by means of an elbow 78, a fixed depending rod 80 which has a lower end portion 82 which is inwardly angled toward the standard and has a lateral annular flange 84 on its lower end. Rotatably circumposed on the portion 82 above the flange 84 is an apertured transversely disposed bar 86, opposite ends of which have secured thereto depending semicircular ears 88, see Figure 3, which have extending therethrough circumferentially spaced holes through which are engaged the upper ends of flexible chains 90. The lower ends of the chains 90 extend through apertured side flanges 94 of a horizontal plate 96, constituting a seat assembly for an invalid.

When it is desired to remove an invalid from the front seat 16 of the vehicle, the boom 48 is pivoted, and moved endwise in the sleeve 44, and the standard 36 rotated in the socket 22 to position the seat assembly 92 on the seat 16, from which the invalid is moved onto the seat assembly.

The boom 48 is then swung out of the vehicle for depositing the invalid on such as a wheel-chair positioned alongside of the vehicle. Reverse operation of the apparatus enables lifting an invalid from a wheel-chair onto the front seat 16, the necessary vertical adjustment of the boom 48 being made by operating the jack 62.

Figure 2:
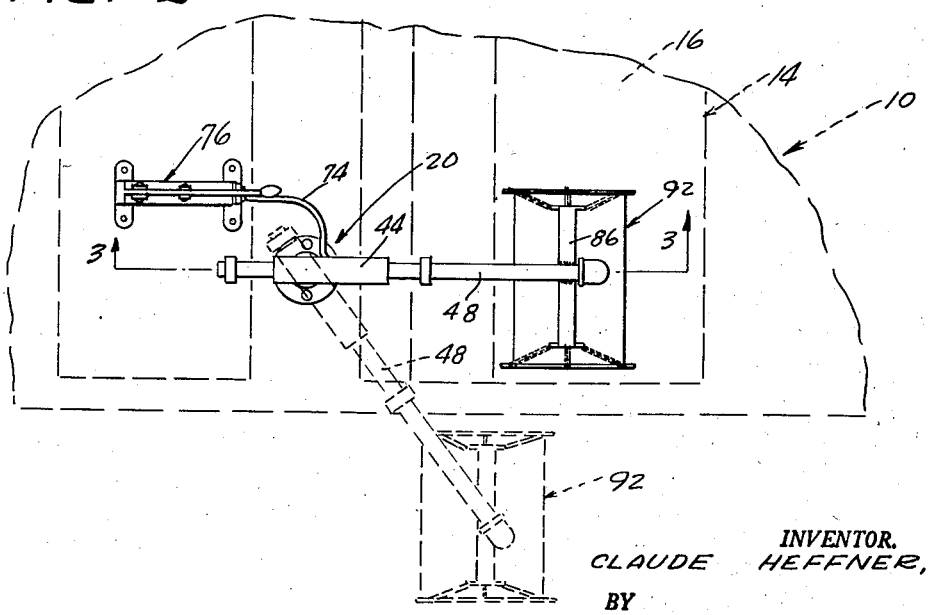
Figure 2 is a top plan view of the invalid handling apparatus, showing in phantom lines portions of the associated vehicle, and showing the boom in phantom lines rotated for disposing an invalid outside of the vehicle.

Indicated generally at 100 in Figure 4 is another form of invalid handling apparatus whose socket 22 is located close to the front edge of the rear seat assembly 104 behind the front seat assembly 14. The standard or column 106 of the apparatus includes an intermediate right-angled rearwardly offset portion 108. The boom 48 supports on its depending rod a seat assembly 92. A gusset plate 110 is secured at the angle of the column 106 and the offset portion 108, and has pivotally secured thereto by means of a pivot 112 the lower end of the piston rod 60 of the jack 62. The apparatus of Figure 4 is otherwise similar to that of Figures 1 to 3.

Although a hand pump has been disclosed for operating the fluid jack, it is apparent that the fluid jack may be operated by any other suitable fluid pressure means, such as a pump operated by the engine of the vehicle. Further, although the apparatus has been disclosed as being especially adaptable for handling of invalids, other loads such as bulky packages, for example, may be handled by the apparatus.

The foregoing is considered as illustrative only of the principles of the invention. Since numerous modifica-

What is claimed is:

1. Apparatus for handling an invalid comprising a socket adapted to be secured to a support, a vertical standard having upper and lower ends, the lower end of the standard being rotatably and removably seated in said socket, a horizontal sleeve horizontally pivoted on the upper end of the standard, a boom reciprocable in said sleeve, spaced stop means on the boom engageable with said sleeve for limiting length of movement of the boom relative to the sleeve, said boom having an outer end, an invalid seat assembly suspended from said outer end, and extensible jack means secured to and acting between said standard and said sleeve.

2. Apparatus for handling an invalid comprising a socket adapted to be secured to a support, a vertical standard having upper and lower ends, the lower end of the standard being rotatably and removably seated in said socket, a horizontal sleeve horizontally pivoted on the upper end of the standard, a boom slidable endwise in said sleeve, stop means on the boom engageable with said sleeve for limiting endwise movement of the boom relative to the sleeve, said boom having an outer end, an invalid seat assembly suspended from said outer end, extensible jack means secured to and acting between said standard and said sleeve, fixed depending rods on its outer end, said rod having a lower end having a lateral annular flange thereon, a plate rotatably circumposed on the rod above said flange, said seat assembly being suspended from said plate.

References Cited in the file of this patent

UNITED STATES PATENTS

| | | |
|---|---|---|
| 1,567,285 | Mitchell | Dec. 29, 1925 |
| 1,878,785 | Leavitt | Sept. 20, 1932 |
| 2,462,926 | Wilson | Mar. 1, 1949 |
| 2,650,725 | Hoyer et al. | Sept. 1, 1953 |
| 2,653,330 | Nolan | Sept. 29, 1953 |
| 2,672,990 | Sundin | Mar. 23, 1954 |
| 2,792,951 | White | May 21, 1957 |
| 2,793,768 | Schaedler | May 28, 1957 |

FOREIGN PATENTS

| | | |
|---|---|---|
| 871,362 | Germany | Mar. 23, 1953 |